US009018923B2

(12) United States Patent
Parkhurst et al.

(10) Patent No.: US 9,018,923 B2
(45) Date of Patent: Apr. 28, 2015

(54) DYNAMIC BIAS SOFT START CONTROL APPARATUS AND METHODS

(75) Inventors: Charles Parkhurst, Murphy, TX (US); Mark Hamlyn, Melissa, TX (US)

(73) Assignee: Texas Instruments Incorporated, Dallas, TX (US)

( * ) Notice: Subject to any disclaimer, the term of this patent is extended or adjusted under 35 U.S.C. 154(b) by 591 days.

(21) Appl. No.: 13/311,242

(22) Filed: Dec. 5, 2011

(65) Prior Publication Data

US 2013/0141059 A1    Jun. 6, 2013

(51) Int. Cl.
*G05F 1/46* (2006.01)
*H02M 3/156* (2006.01)
*H02M 1/36* (2007.01)
*H02M 1/32* (2007.01)

(52) U.S. Cl.
CPC ........... *H02M 3/156* (2013.01); *H02M 1/32* (2013.01); *H02M 1/36* (2013.01); *Y10S 323/901* (2013.01)

(58) Field of Classification Search
USPC ......... 323/238, 271, 321, 901, 280, 315, 316, 323/277, 273; 363/49
See application file for complete search history.

(56) References Cited

U.S. PATENT DOCUMENTS

| 6,369,561 | B1 * | 4/2002 | Pappalardo et al. | 323/285 |
| 6,552,517 | B1 | 4/2003 | Ribellino et al. | |
| 7,078,885 | B2 * | 7/2006 | Prexl | 323/277 |
| 8,330,532 | B2 * | 12/2012 | Nikolov et al. | 327/540 |
| 2009/0115379 | A1 * | 5/2009 | Al-Shyoukh | 323/238 |
| 2012/0025801 | A1 * | 2/2012 | Hirose et al. | 323/313 |

* cited by examiner

*Primary Examiner* — Jessica Han
*Assistant Examiner* — Gustavo Rosario Benitez
(74) *Attorney, Agent, or Firm* — Alan A. R. Cooper; Frank D. Cimino (57) ABSTRACT

Apparatus and methods operate to disable a dynamically biased apparatus and a dynamic bias current source providing dynamic bias current to the apparatus at the beginning of a static bias startup period shortly after power-on. The dynamically biased apparatus is then gradually enabled in a static bias mode of operation during the static bias startup period. Following the end of the static bias startup period, operation of the dynamically biased apparatus in a dynamic transconductance mode is gradually enabled during a dynamic bias startup period. Such startup sequence operates to prevent damaging in-rush currents in a system employing the dynamically biased apparatus in a feedback control loop.

17 Claims, 6 Drawing Sheets

DYNAMIC BIAS SOFT START CONTROL APPARATUS AND METHODS

TECHNICAL FIELD

Embodiments described herein relate to apparatus and methods associated with electronic circuits, including structures and methods associated with dynamically biased amplifiers.

BACKGROUND INFORMATION

Linear amplifiers are used in a variety of applications, including, e.g., audio, video, and power supplies. Linearity between the amplifier input signal and the output signal enables the faithful reproduction of analog information presented at the amplifier input. A key metric associated with linearity and amplifier quality is slew rate, often expressed as volts per second (millivolts per microsecond, etc.). Slew rate is a measure of the maximum rate of change of the information signal at a particular point within the amplifier. A poor slew rate may result in a distorted output, as fast-changing portions of the information signal are delayed in time relative to other portions of the signal.

One application for which amplifier slew rate may be particularly important is that of regulating the output voltage of a switching DC-DC voltage converter. A switching DC down-converter (known in the art as a "buck" converter) alternately makes and breaks a circuit path between the converter DC supply input and an energy conversion inductor. During the ON state, the inductor stores energy in a magnetic field as current flows through the inductor. During the OFF state, the collapsing magnetic field generates current at the converter output. The inductor thus integrates the switched waveform to create an output voltage waveform proportional to the duty cycle of the active-state switched waveform. A filter capacitor is typically used to smooth the voltage waveform at the converter output.

To maintain a voltage set-point at the output of a DC-DC converter as load current demand changes, the output voltage level may be monitored and fed back to a circuit controlling the switching duty cycle. The slew rate of the DC-DC converter feedback circuit may be particularly important in applications requiring tight voltage regulation. For example, modern processors typically employ hundreds of millions of transistors. The on/off state of each transistor contributes to the overall instantaneous current load presented to the DC power supply. The latter current load may be quite high and may change substantially within a few microseconds. And, low-voltage operation associated with today's microprocessor technology presents an additional challenge to DC power supply regulation requirements, given that small supply voltage variations may represent a significant percentage of a processor's operating voltage margin.

The slew rate of an error amplifier situated in the feedback loop associated with a DC-DC converter may be improved through the use of dynamic biasing techniques. Signals applied to the differential inputs of the error amplifier typically include a reference voltage and a voltage divided sample of the converter output. The feedback error signal appears at the output of the error amplifier. Some error amplifiers use a "dynamic bias" current circuit to provide a variable current source as the error signal. The magnitude of the current source is proportional to the magnitude of the difference between the reference voltage and the converter output sample voltages appearing at the error amplifier differential inputs.

An additional challenge for DC-DC converter design is the instantaneous and possibly indeterminate state of voltage regulation-determining components when power is switched on to the converter. Power-handling components should be protected against in-rush currents during the switch-on period.

SUMMARY OF THE INVENTION

Embodiments and methods herein operate to prevent output voltage overshoot and excessive in-rush current at power-on in systems including dynamically biased apparatus. Dynamically biased apparatus may include, for example, an error amplifier configured in a voltage regulation feedback loop associated with a switching power supply. The output of the dynamically biased apparatus and dynamic bias current to the apparatus are disabled at the beginning of a static bias startup period shortly after power-on. The output is then gradually enabled and a static bias startup current is enabled to the apparatus during the static bias startup period. Following the end of the static bias startup period, dynamic bias current is gradually enabled to the apparatus during a dynamic bias startup period. It is noted that example embodiments may be described with reference to a DC-DC converter. However, structures and methods outlined herein may be applied to other dynamically biased apparatus incorporated into other applicable systems.

As used herein, the term "transconductance device" means a device used in an electronic circuit to control a magnitude of electrical current flow as a function of a magnitude of a voltage applied to the input of the device. As such, transconductance devices may include semiconductor devices such as metal oxide semiconductor field effect transistors (MOSFETs) with gate, source, and drain terminals, and bipolar junction transistors with base, collector, and emitter terminals. Transconductance devices may also be embodied in vacuum tube devices, organic transistors, and other technologies. In the case of MOSFETs, the principal current-carrying channel is configured as a drain-to-source path through the MOSFET device and the input element is configured as a MOSFET gate.

DETAILED DESCRIPTION

Figure 1:
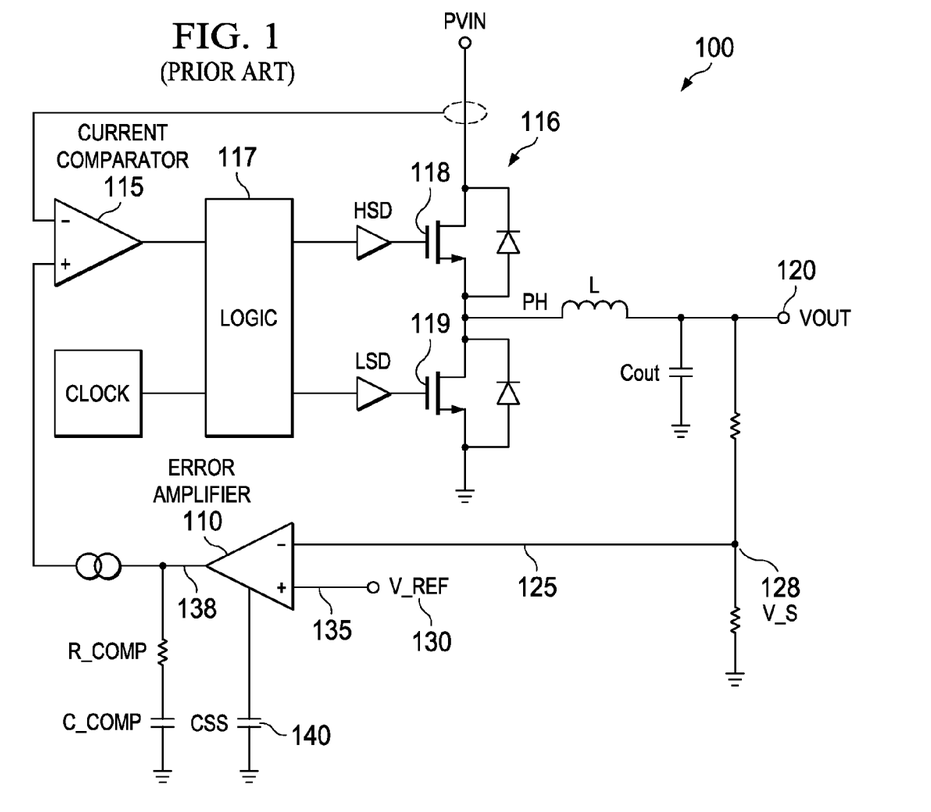
FIG. 1 is a schematic diagram of a DC-DC converter illustrating a differential error amplifier as a component of a voltage regulation feedback loop.

FIG. 1 is a schematic diagram of a DC-DC converter 100 illustrating a differential error amplifier 110 as a component of a voltage regulation feedback loop. A current comparator 115 compares a current analog of an error signal produced by the error amplifier 110 to current flowing into the DC-DC converter 100 at the converter input 116. Logic circuitry 117 adjusts the duty cycle of the switching power transistors 118 and 119 according to the difference sensed by the current comparator 115 to maintain a setpoint voltage at the converter output 120.

Voltage sag at the converter output 120 is detected at the input 125 of the error amplifier 110 as sampled at voltage divider node 128. The error amplifier 110 compares the voltage sample to a reference voltage 130 applied to the input 135. The converter output voltage error signal appears at the output 138 of the error amplifier 110. The error signal is a function of the difference in magnitude between the voltage reference 130 and the output voltage sample appearing at the error amplifier input 125.

During startup, the error signal at the output 138 and other signals appearing at the converter feedback, logic, and/or driver sections illustrated by FIG. 1 may be in transient states. Such transient signals may cause destructive amounts of current to be conducted by the switching power transistors 118 and 119.

Figure 2:
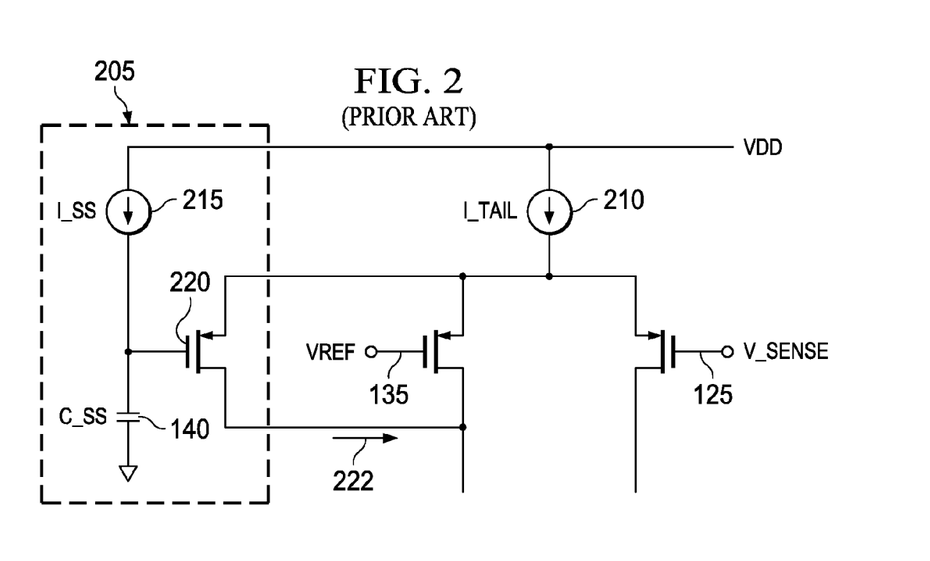
FIG. 2 is a partial schematic diagram of a statically biased error amplifier illustrating a soft start circuit.

FIG. 2 is a partial schematic diagram of a static bias configuration of the error amplifier 110 illustrating a soft start circuit 205. The prior art soft start circuit 205 addresses the possibility of a current overload condition at power-on. The differential input section of the error amplifier 110, including the converter output voltage sample input 125, the reference voltage input 135, and tail current source 210 are also shown on FIG. 2. Other portions of the error amplifier 110 are omitted from for clarity.

Referring now to FIG. 2 in light of FIG. 1, at power-on, power switching transistor 118 is defaulted off to prevent current flow at the input 116 of the DC-DC converter 100. Soft start current source 215 begins to charge soft start capacitor 140, causing soft start transistor 220 to be biased to a conductive state. Soft start transistor 220 injects output-inhibiting current 222 from the tail current source 210 to the voltage reference side of the error amplifier 110. So injected, the output-inhibiting current 222 drives the error signal at the output 138 of the error amplifier 110 such as to maintain the non-conductive state of the power switching transistor 118. In the interest of brevity and generality, the process of driving the output of the dynamically-biased apparatus 412 in this fashion in response to the injection of output-inhibiting current is referred to hereinafter as "disabling" and/or "holding inactive" the output of the dynamically-biased apparatus 412.

As the soft start capacitor 140 charges, the gate-to-source voltage of soft start transistor 220 increases in a positive direction at a rate proportional to a time constant determined by the magnitude of the current produced by the soft start current source 215 and the value of the soft start capacitor 140. Soft start transistor 220 is thus gradually biased to a non-conductive state over the period corresponding to the time constant. The flow of output-inhibiting current 222 consequently decreases and current from the tail current source 210 flows into the input stage of the error amplifier 110. The error signal at the output 138 responds increasingly to the voltage difference at the inputs 125 and 135 as the soft start capacitor 140 charges, the output-inhibiting current 222 decreases, and a stable output voltage is reached.

Replacing the static tail current bias source 210 with a dynamic bias current source (not shown in FIG. 2) may substantially increase the amplifier slew rate, resulting in increased dynamic performance. The dynamic bias current source adjusts the bias current in proportion to the differential voltage appearing at the amplifier inputs 125 and 135. Doing so increases the amplifier transconductance as needed. However, employing dynamic bias in some apparatus, including an error amplifiers used in switching power supply voltage regulation feedback loops, may cause output voltage overshoot and damaging in-rush currents through switching power transistors.

Figure 3:
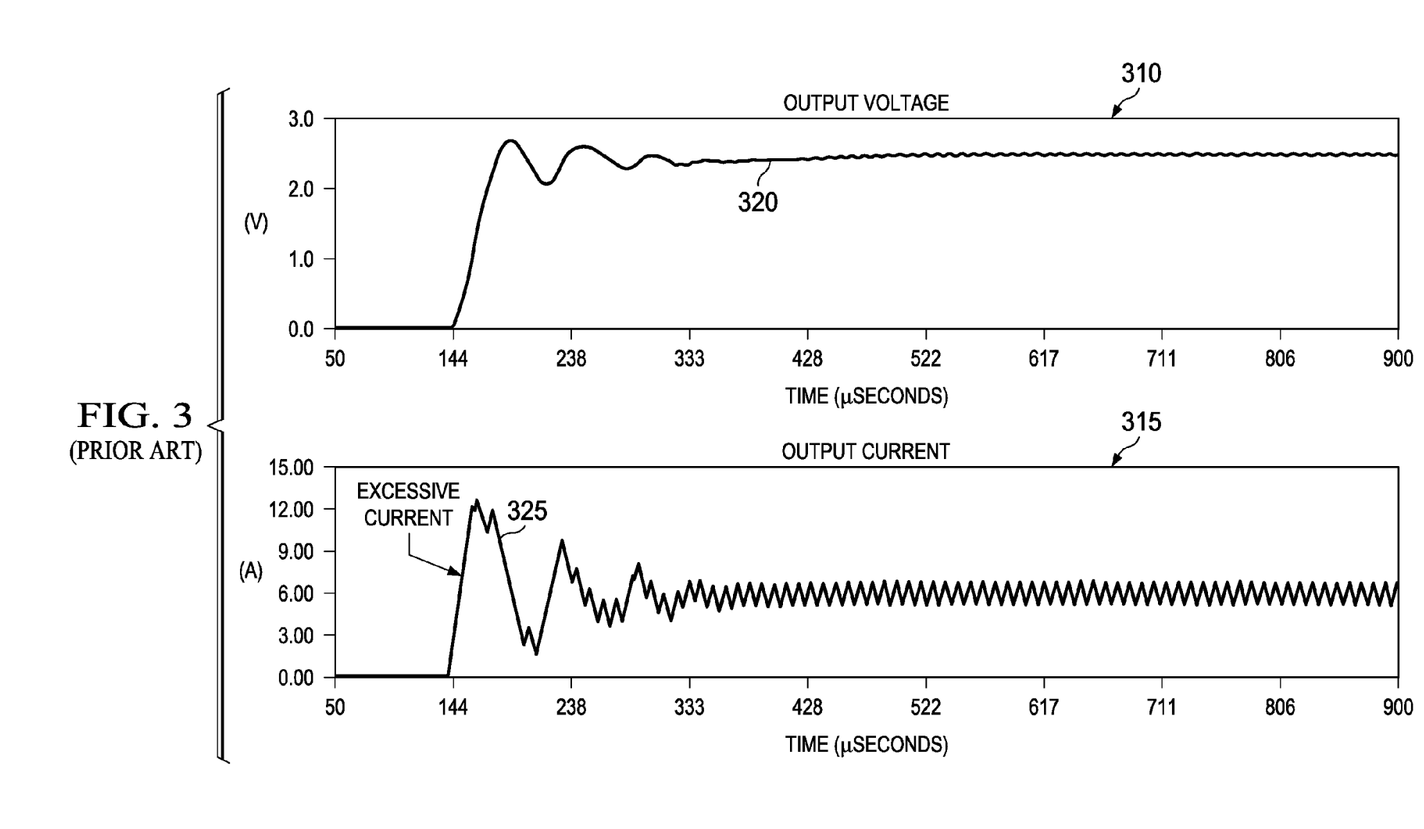
FIG. 3 plots startup voltage and current waveforms measured at the output of a DC-DC converter employing a dynamically biased error amplifier.

FIG. 3 plots startup voltage and current waveforms 320 and 325, respectively, measured at the output of a DC-DC converter employing a dynamically biased error amplifier. The voltage and current plots 310 and 315 correspond to a configuration employing a dynamic bias tail current source (not shown in FIG. 2) in place of the static tail current source 210 in the error amplifier 110. The voltage versus time plot 310 illustrates the ramp-up of converter output voltage in this example during the period from about 144 is to about 350 is from power-on. The current versus time plot 315 illustrates a problematic excessive current condition that may occur at the beginning of the converter startup phase. The excessive current results from the rapid increase in transconductance of the error amplifier 110 as the dynamic bias current source senses a large differential voltage at the amplifier inputs 125 and 135 and injects a correspondingly large amount of bias current.

Figure 4:
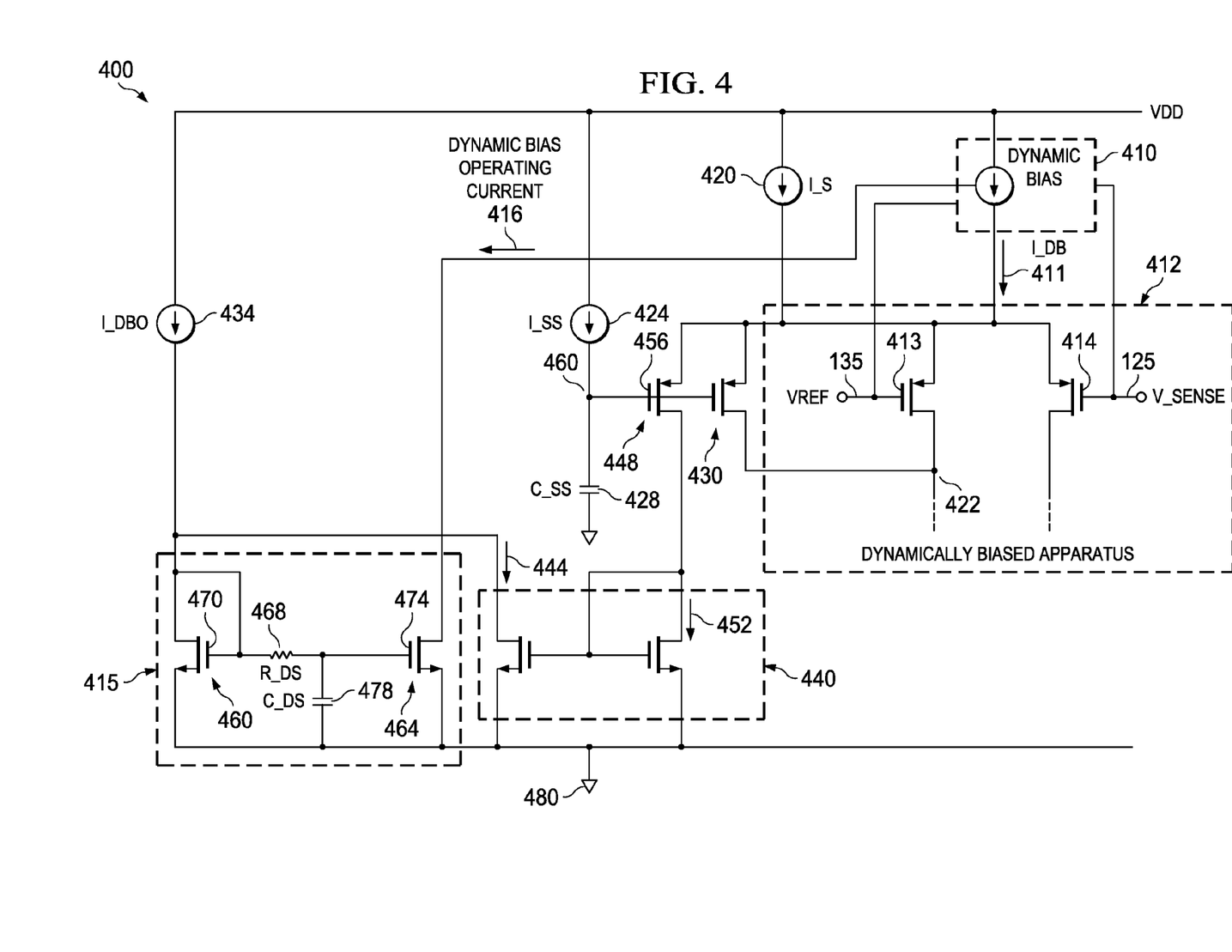
FIG. 4 is a schematic diagram of a dynamic bias soft start control system according to various embodiments of the invention.

FIG. 4 is a schematic diagram of a dynamic bias soft start control system 400 according to various embodiments of the invention. The soft start control system 400 implements a three phase startup sequence for a dynamically biased apparatus 412 at power-on. (For the sake of clarity and generality, the schematic diagram of the dynamically biased apparatus 412 is abbreviated in FIG. 4 to show the input stage only.) First, dynamic bias operation is disabled, the input stage is bypassed, and the output is held inactive. Second, a static bias current is gradually provided during a static bias startup period to enable operation of the dynamically biased apparatus 412 in a static bias mode as the output is enabled. Third, dynamic bias operation is enabled during a dynamic bias startup period following the end of the static bias startup period.

The dynamically biased apparatus 412 portion of the dynamic bias soft start control system 400 may include class AB amplifiers and other devices capable of benefiting from a power-on-demand current source. For example, the dynamically biased apparatus 412 may be configured as an error amplifier to operate in a voltage regulation circuit associated with a DC-DC converter and may be configured with differential inputs as described in examples above.

The dynamic bias soft start control system 400 includes a dynamic bias current source 410 coupled to the dynamically biased apparatus 412. The dynamic bias current source 410 sources dynamic bias current 411 to the dynamically biased apparatus 412 in response to a bias control signal received from the apparatus 412. The dynamically biased apparatus 412 sinks the dynamic bias current 411 and utilizes the current 411 to increase transconductance and to thereby meet instantaneous power demands.

The bias control signal may be any signal indicative of an imminent instantaneous power demand placed upon the dynamically biased apparatus 412. For example, an input signal appearing at the differential inputs 125 and 135 of a differential error amplifier input stage (e.g., the input stage including transconductance devices 413 and 414 of FIG. 4) in a power supply regulation feedback loop may serve as the bias control signal.

The dynamic bias soft start control system 400 also includes a dynamic bias hold-off circuit communicatively coupled to the dynamically biased apparatus 412. The dynamic bias hold-off circuit, described in detail below, disables the dynamic bias current source 410 at power-on until the end of a static bias startup period. Disabling the dynamic bias current source 410 in turn disables dynamic bias current 411 to the apparatus 412. Disabling dynamic bias prevents operation of the apparatus 412 in a dynamic transconductance mode during the static bias startup period. Doing so operates to prevent large surge currents that might otherwise result from the high-transconductance amplification of transient signals at power-on.

With the dynamic bias current 411 to the dynamically biased apparatus 412 disabled, the apparatus 412 requires bias current from another source in order to start up. To meet this need, the soft start control system 400 includes a static bias current source 420 communicatively coupled to the dynamically biased apparatus 412. Current from the static bias current source 420 is initially injected as an output-disabling current (e.g., the current 222 of FIG. 2) to a selected node 422 of the apparatus 412 to disable the output of the apparatus 412. Subsequently, as the associated circuits stabilize during the static bias startup period, the static bias current source 420 provides static bias current to the apparatus 412 prior to enabling dynamic bias current 411 from the dynamic bias current source 410.

A static bias startup circuit including components further described below is communicatively coupled to the static bias current source 420 to implement the first and second phases described above. The static bias startup circuit passes the output-inhibiting current 222 from the static bias current source 420 to the node 422 at power-on. The static bias startup circuit then gradually decreases the output-inhibiting current 222, thus enabling static bias current to flow from the static bias current source 420 to the apparatus 412. The static bias current flow gradually enables operation of the apparatus 412 in a static bias mode during a static bias startup period corresponding to a static bias startup time constant as follows.

A soft start current source 424 begins to charge a soft start capacitor 428 at power-on. An input element of a soft start transconductance device 430 is coupled to a node between the soft start current source 424 and the soft start capacitor 428. The soft start transconductance device 430 is initially biased on by the negative voltage appearing across the soft start capacitor 428 as charge current flows into the capacitor 428. The soft start transconductance device 430 passes an output-inhibiting current from the static bias current source to node 422 of the apparatus 412. The output-inhibiting current causes the output of the dynamically biased apparatus 412 to be initially exerted to an inactive state at startup. Doing so effectively bypasses the differential input stage, as previously mentioned.

As the soft start capacitor 428 charges, the gate to source voltage of the soft start transconductance device 430 increases positively, gradually turning the device 430 off and disabling the flow of output-disabling current 222 to node 422. No longer diverted to node 422, static bias current from the static bias current source 420 becomes available as tail current to the input stage transconductance devices 413 and 414 of the dynamically biased apparatus 412. With its output no longer clamped inactive and bias tail current available, the dynamically biased apparatus 412 becomes operational in a static bias mode.

Returning now to the subject of disabling dynamic bias-mode operation of the dynamically biased apparatus 412 at startup, the soft start control system 400 includes a dynamic bias hold-off circuit coupled to the static bias startup circuit (e.g., coupled to the soft start current source 424, to the soft start capacitor 428, and to the soft start current source 420).

The dynamic bias hold-off circuit delays operation of the dynamic bias current source at power on until completion of the static bias startup period.

The dynamic bias hold-off circuit includes a bypass current mirror 440. An output-side current channel (e.g., a drain to source current path through a MOSFET) of the bypass current mirror 440 is configured in series between an operating current source 434 and ground 480. During the static bias startup period, the bypass current mirror 440 shunts current 444 from the operating current source 434 to ground 480. Doing so depletes operating current required by the dynamic bias current source 410 to produce dynamic bias current 411.

The dynamic bias hold-off circuit also includes a bypass transconductance device 448 coupled in series between the static bias startup circuit and an input-side current channel of the bypass current mirror 440. At an input element (e.g., a MOSFET gate) of the bypass transconductance device 448 is coupled to the node between the soft start current source 424 and the soft start capacitor 428. The bypass transconductance device 448 sources a current 452 to flow through the bypass current mirror 440 according to the time constant established by the static bias startup circuit.

The bypass transconductance device 448 is biased on as the soft start capacitor 428 begins charging at startup. As the soft start capacitor 428 continues to charge, the bypass transconductance device 448 gradually turns off during the static bypass startup period. Input current 452 and consequently bypass current 444 therefore decrease at a rate determined by the time constant associated with the soft start current source 424 and the soft start capacitor 428. As the bypass current mirror 440 conducts a decreasing amount of bypass current 444, current from the operating current source 434 begins to flow into a time-delayed current mirror 415.

The time-delayed current mirror 415, a component circuit of the dynamic bias soft start control system 400, is communicatively coupled in series between the operating current source 434 and the dynamic bias current source 410. The time-delayed current mirror 415 ramps up operating current 416 to the dynamic bias current source 410 during a dynamic bias startup period following the end of the static bias startup period. The dynamic bias startup period corresponds to a time constant associated with the time-delayed current mirror 415 as further described below.

The time-delayed current mirror 415 includes an operating current input transconductance device 460 (e.g., a MOSFET) in series with the operating current source 434. The input transconductance device 460 is configured as an input side of the time-delayed current mirror 415. The current mirror 415 also includes an operating current output transconductance device 464 coupled to the dynamic bias current source 410. The output transconductance device 464 begins to sink operating current 416 from the dynamic bias current source 410 following the end of the static bias startup period.

A dynamic bias startup resistor 468 is coupled in series between an input element 470 (e.g., a MOSFET gate) associated with the input transconductance device 460 and an input element 474 associated with the output transconductance device 464. A dynamic bias startup capacitor 478 is coupled between the input element 474 and ground 480. The startup resistor 468 and the startup capacitor 478 determine the time constant associated with the dynamic bias startup period.

Current from the operating current source 434 flows into the time-delayed current mirror 415 through the startup resistor 468 and begins to charge the startup capacitor 478 upon expiration of the static bias startup period. As charge builds on the startup capacitor 478 during the dynamic bias startup period, the output transconductance device 464 becomes positively biased and begins to sink operating current 416 to the dynamic bias current source 410. The operating current 416 enables operation of the dynamic bias current source 410; and the dynamic bias current source 410 begins to supply dynamic bias current 411 to the dynamically biased apparatus 412. The apparatus 412 consequently begins to operate in a dynamically biased mode and exhibits performance consistent with dynamic transconductance.

Figure 5:
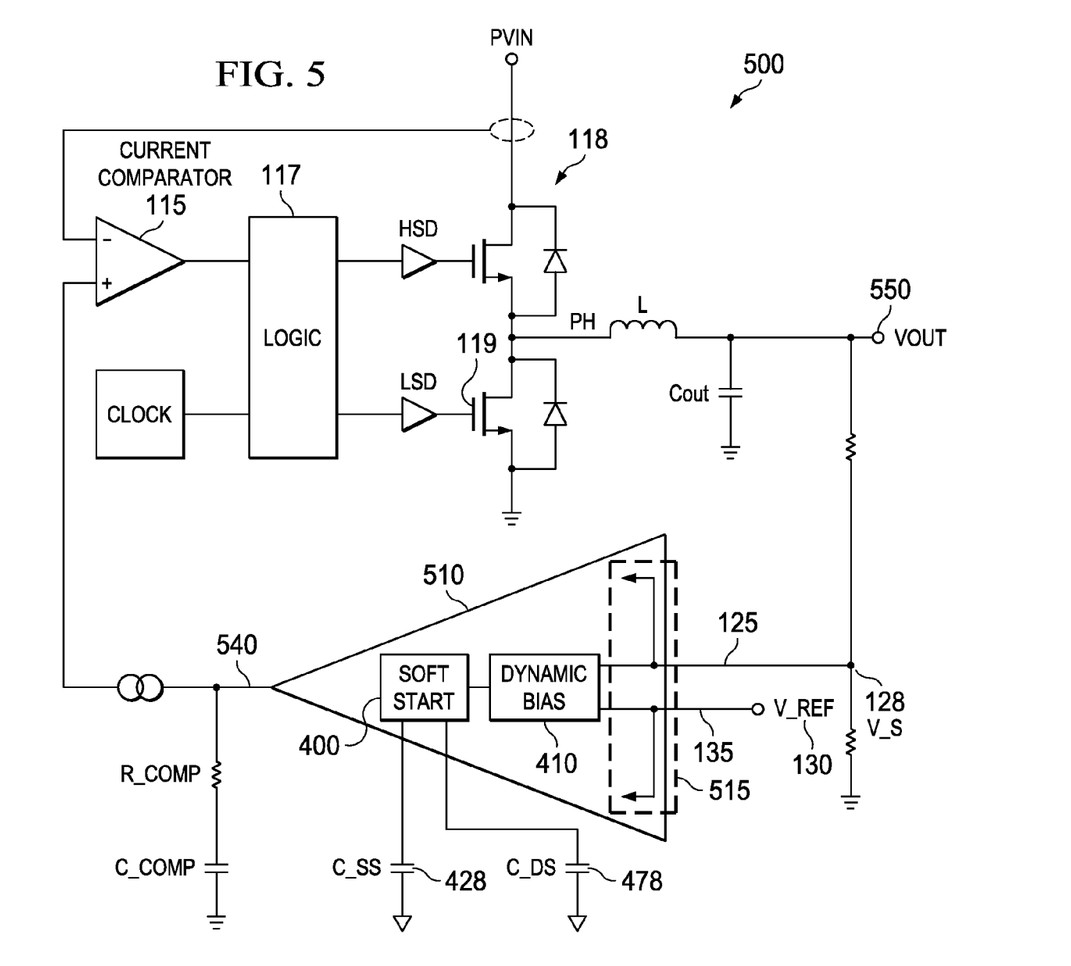
FIG. 5 is a schematic diagram of a high slew rate voltage regulation error amplifier in a DC-DC converter according to various example embodiments.

FIG. 5 is a schematic diagram of a high slew rate voltage regulation error amplifier 510 in a DC-DC converter 500 according to various example embodiments. The error amplifier 510 includes a class AB differential amplifier input stage 515 including two transconductance devices connected as a differential pair (not shown in FIG. 5). An input 125 of the error amplifier 510 is coupled to one of the transconductance devices to receive a sample from a voltage divider node 128 of the regulated voltage appearing at the converter output 550. An input 135 of the error amplifier 510 is coupled to the other transconductance device associated with the differential pair. A reference voltage 130 is presented at the input 135. The error amplifier 510 also includes a dynamic bias current source 410 and a soft start system 400 configured to operate as previously described.

Modules and components described herein may include hardware circuitry, optical components, single or multi-processor circuits, memory circuits, and/or computer-readable media with computer instructions encoded therein/thereon capable of being executed by a processor including non-volatile memory with firmware stored therein, but excluding non-functional descriptive matter), and combinations thereof, as desired by the architects of the soft start control system 400 and the voltage regulation amplifier 510 and as appropriate for particular implementations of various embodiments.

Apparatus and systems described herein may be useful in applications other than avoiding in-rush currents and voltage overshoot caused by transient signals in an error signal feedback amplifier associated with a DC-DC converter. Other applications may exist for a soft start control system. Examples of the soft start control system 400 and the voltage regulation amplifier 510 are intended to provide a general understanding of the structures of various embodiments. They are not intended to serve as complete descriptions of all elements and features of apparatus and systems that might make use of these structures.

The various embodiments may be incorporated into electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may also include one or more methods.

Figure 6:
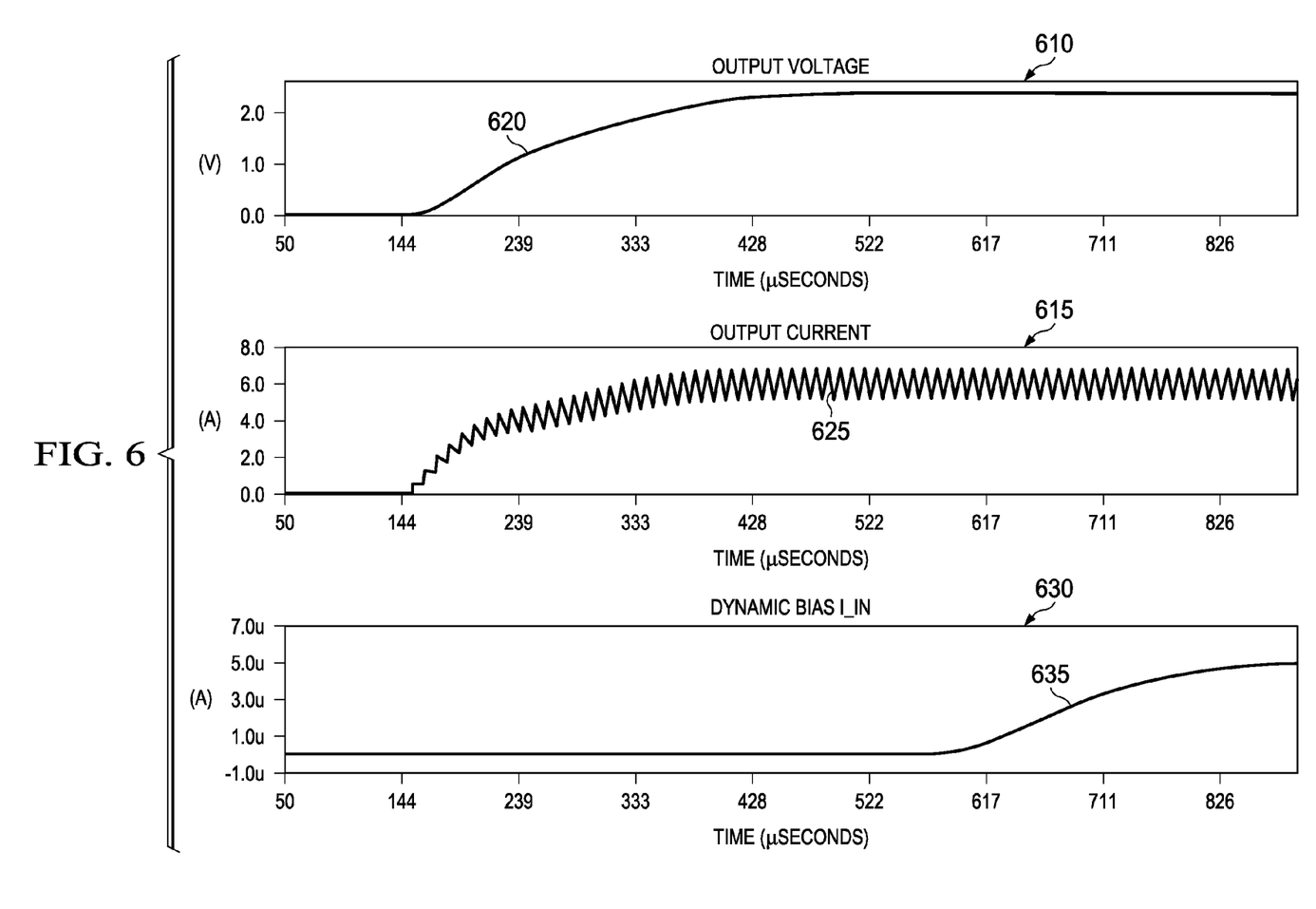
FIG. 6 plots startup voltage and current waveforms appearing at the output of a DC-DC converter employing a dynamic bias soft start control system according to various example embodiments.

FIG. 6 plots startup voltage and current waveforms 620 and 625, respectively, appearing at the output of a DC-DC converter employing a dynamic bias soft start control system according to various example embodiments (e.g., the DC-DC converter 500 of FIG. 5, including the error amplifier 510 incorporating dynamic bias current source 410 and soft start system 400).

Output voltage plot 610 illustrates that the converter output is zero for approximately 144 is after power-on. This result obtains from the output-inhibiting current 222 of FIG. 2 injected into the node 422 of FIG. 4 at power-on. The voltage waveform 620 ramps up from approximately 144 is to approximately 522 is during the static bias startup period. It is noted from the output current plot 615 that the output current waveform 625 is stable during startup and ramps up smoothly without introducing unacceptable current spikes. The current waveform 635 of plot 630 illustrates the operating current 416 of FIG. 4, beginning shortly after power-on. The dynamic bias hold-off circuit of the soft start control system 400 disables current to the time-delayed current mirror 415 until after the converter output voltage has ramped up during the static bias startup period and is operating stably in a static bias mode. Only then is operating current to the time-delayed current mirror 415 enabled and the time delayed current mirror 415 allowed to ramp up operating current to the dynamic bias current source 410. As the operating current represented by the waveform 635 ramps up between about 617 µs and 850 µs, the dynamic bias current source 410 begins to provide dynamic tail current to the amplifier 510 of FIG. 5 and the amplifier 510 begins to operate in a dynamic transconductance mode.

Figure 7:
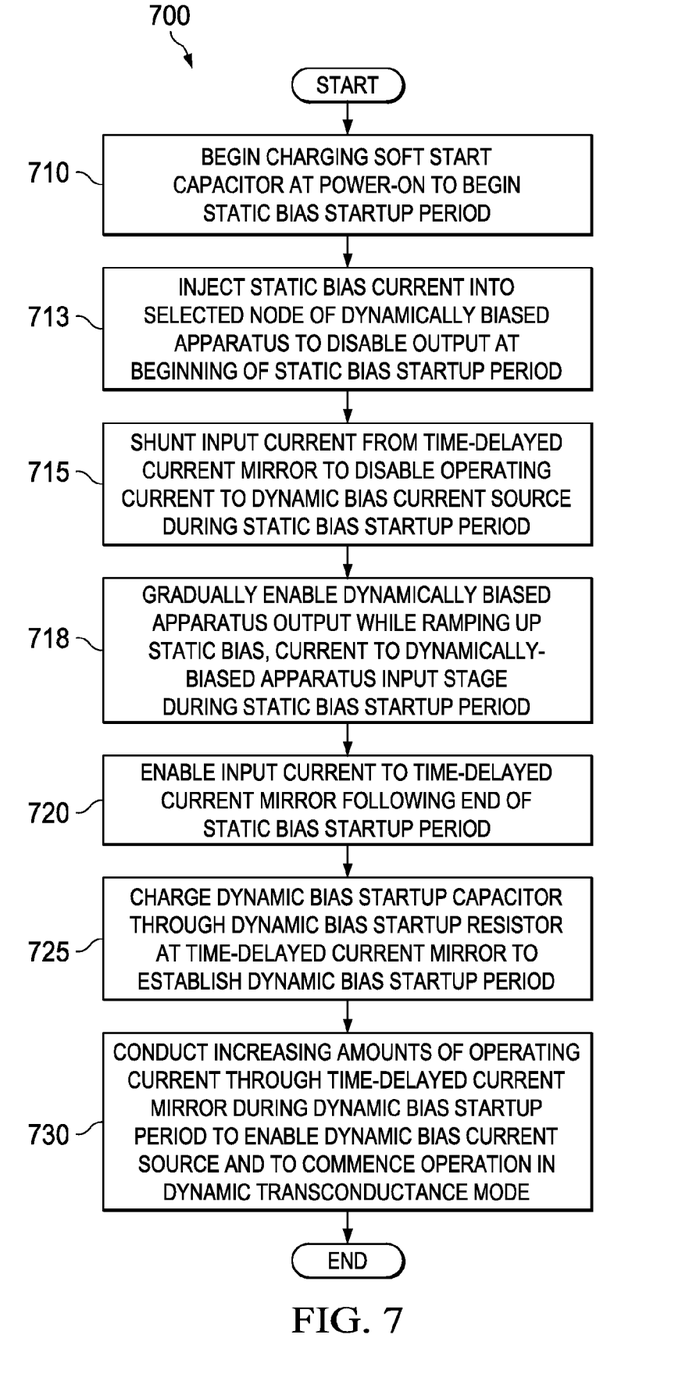
FIG. 7 is a flow diagram illustrating a soft start method associated with a dynamically biased apparatus according to an example sequence.

FIG. 7 is a flow diagram illustrating a method 700 of starting up a dynamically biased apparatus (e.g., the dynamically biased apparatus 412 of FIG. 4) according to an example sequence. Employing the method 700 or an analog thereof may avoid damaging surge currents at power-on in a system employing the dynamically biased apparatus.

The method 700 begins at block 710 with charging a soft start capacitor (e.g., the soft start capacitor 428 of FIG. 4) using a soft start current source (e.g., the soft start current source 424) to establish a static bias startup period.

The method 700 continues with injecting an output-disabling current into a selected node of the dynamically biased apparatus at the beginning of the static bias startup period, at block 713. Doing so drives the output of the dynamically biased apparatus in a direction such as to provide negative feedback to the system. This effectively prevents the dynamically biased apparatus from responding to signals at its inputs.

The method 700 also includes shunting input current away from a time delayed current mirror, at block 715. Doing so disables operating current to a dynamic bias current source and thereby disables dynamic bias current to the dynamically biased apparatus during the static bias startup period.

The method 700 further includes gradually enabling the output of the dynamically biased apparatus by decreasing the output-disabling current while ramping up a static bias current to the dynamically biased apparatus input stage during the static bias startup period, at block 718. This activity results in the dynamically biased apparatus commencing operation in a statically-bias mode during the static bias startup period.

The method 700 continues at block 720 with enabling input current to the time-delayed current mirror following the end of the static bias startup period. Charging a dynamic bias startup capacitor through a dynamic bias startup resistor at the time-delayed current mirror establishes a dynamic bias startup period.

The method 700 terminated set at block 730 with conducting increasing amounts of operating current through the time delayed current mirror during the dynamic bias startup period. Doing so enables operation of the dynamic bias current source, activation of a dynamic bias current to the dynamically biased apparatus, and commencement of operation of the dynamically biased apparatus in a dynamic transconductance mode.

Apparatus and methods described herein disable a dynamically biased apparatus and a dynamic bias current source providing dynamic bias current to the apparatus at the beginning of a static bias startup period shortly after power-on. The dynamically biased apparatus is then gradually enabled in a static bias mode of operation during the static bias startup period. Following the end of the static bias startup period, operation of the dynamically biased apparatus in a dynamic transconductance mode is gradually enabled during a dynamic bias startup period. Such startup sequence may operate to prevent damaging in-rush currents in a system employing the dynamically biased apparatus in a feedback control loop.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A soft start control system, comprising: a dynamic bias current source to source a dynamic bias current in a magnitude proportional to a bias control signal received at the dynamic bias current source; a dynamically biased apparatus communicatively coupled to the dynamic bias current source to sink the dynamic bias current; and a dynamic bias hold-off circuit communicatively coupled to the dynamically biased apparatus to delay operation of the dynamic bias current source at power-on until completion of a static bias startup period; and an operating current source communicatively coupled to the dynamic bias current source to supply operating current to the dynamic bias current source; and a time-delayed current mirror configured in series between the operating current source and the dynamic bias current source, the time-delayed current mirror to ramp up a time-delayed operating current to the dynamic bias current source following the static bias startup period; and the time-delayed current mirror further comprising: an operating current input transconductance device in series with the operating current source; an operating current output transconductance device to provide the operating current to the dynamic bias current source following the dynamic bias hold-off period; a dynamic bias startup resistor coupled in series between an input element associated with the operating current input transconductance device and an input element associated with the operating current output transconductance device; and a dynamic bias startup capacitor coupled between the input element associated with the operating current output transconductance device and ground, the dynamic bias startup resistor and the dynamic bias startup capacitor to establish a time constant associated with a dynamic bias ramp up period.

2. The soft start control system of claim 1, further comprising:
 a static bias current source communicatively coupled to the dynamically biased apparatus to provide a startup bias current to the dynamically biased apparatus during the static bias startup period; and
 a static bias startup circuit communicatively coupled to the static bias current source to pass an output-inhibiting current from the static bias current source to a selected node of the dynamically biased apparatus at a start of the static bias startup period, the output-inhibiting current to disable an output of the dynamically biased apparatus, and to gradually enable the output of the dynamically biased apparatus while enabling a static bias current to the dynamically biased apparatus during the static bias startup period at a rate proportional to a time constant associated with the static bias startup circuit.

3. The soft start control system of claim 2, the static bias startup circuit further comprising:
 a soft start current source;
 a soft start capacitor configured between the soft start current source and ground; and
 a soft start transconductance device coupled by an input element to a node between the soft start current source and the soft start capacitor, the soft start transconductance device to pass the output-inhibiting current from the static bias current source to the selected node of the dynamically biased apparatus at the start of the static bias startup period and to gradually decrease the output-inhibiting current during the static bias startup period.

4. The soft start control system of claim 3, the dynamic bias hold-off circuit further comprising:
 a bypass current mirror to sink operating current from an operating current source during the static bias startup period, an output-side current channel of the bypass current mirror in series with the operating current source; and
 a bypass transconductance device in series between the static bias current source and an input-side current channel of the bypass current mirror, an input element of the bypass transconductance device coupled to the node between the soft start current source and the soft start capacitor, the bypass transconductance device to pass a decreasing amount of current to the bypass current mirror as the soft start capacitor charges.

5. The soft start control system of claim 4, at least one of the output-side current channel or the input-side current channel configured as a drain to source current path through a metal oxide semiconductor field effect transistor (MOSFET) device and the input element of the bypass transconductance device configured as a MOSFET gate.

6. The soft start control system of claim 1, the operating current input and output transconductance devices configured as metal oxide semiconductor field-effect transistors (MOSFETs) and the input elements of the operating current input and output transconductance devices configured as MOSFET gates.

7. The soft start control system of claim 1, the dynamically biased apparatus configured with a differential input stage.

8. The soft start control system of claim 1, the dynamically biased apparatus configured as a voltage regulation error amplifier.

9. The soft start control system of claim 1, the dynamically biased apparatus configured as a DC-DC converter feedback component.

10. The soft start control system of claim 1, the dynamic bias current source configured to receive the bias control signal as a differential voltage.

11. A voltage regulation error amplifier comprising: a class AB differential amplifier input stage including two transconductance devices configured as a differential pair, an input element of one of the transconductance devices to receive a regulated voltage output sample, an input element of the other transconductance device coupled to a reference voltage source; a static bias current source communicatively coupled to the error amplifier input stage to source a static bias startup current to the error amplifier, during the static startup period; a static bias startup circuit communicatively coupled to the static bias current source to ramp up the static bias startup current during the static bias startup period corresponding to a time constant associated with the static bias startup circuit, wherein the static bias startup circuit is communicatively coupled to the static bias current source to pass an output-inhibiting current from the static bias current source to a selected node of the error amplifier at a start of the static bias startup period, the output-inhibiting current to disable an output of the error amplifier, and to gradually enable the output of the error amplifier while enabling a static bias current to the dynamically biased apparatus during the static bias startup period at a rate proportional to a time constant associated with the static bias startup circuit; a dynamic bias current source communicatively coupled to the error amplifier input stage to source a dynamic bias current to the error amplifier in a magnitude proportional to a differential voltage appearing at the input elements of the two transconductance devices; a time-delayed current mirror communicatively coupled to the dynamic bias current source to ramp up a time-delayed operating current to the dynamic bias current source during a dynamic bias startup period following the static bias startup period, the dynamic bias startup period corresponding to a time constant associated with the time-delayed current mirror.

12. The voltage regulation error amplifier of claim 11, further comprising:
an operating current source communicatively coupled to the time-delayed current mirror to supply an operating current to the time-delayed current mirror.

13. The voltage regulation error amplifier of claim 12, the time-delayed current mirror further comprising:

an operating current input transconductance device configured in series with the operating current source as an input side of the time-delayed current mirror;
an operating current output transconductance device to sink the time-delayed operating current from the dynamic bias current source following the static bias startup period;
a dynamic bias startup resistor coupled in series between an input element associated with the operating current input transconductance device and an input element associated with the operating current output transconductance device; and
a dynamic bias startup capacitor coupled between the input element associated with the operating current output transconductance device and ground, the dynamic bias startup resistor and the dynamic bias startup capacitor to determine the time constant associated with the dynamic bias startup period.

14. A method of soft startup of a dynamically biased apparatus, comprising: disabling an output of the dynamically biased apparatus at a beginning of a static bias startup period; disabling a dynamic bias current to the dynamically biased apparatus at the beginning of the static bias startup period; gradually enabling the output of the dynamically biased apparatus while enabling a static bias current to the dynamically biased apparatus during the static bias startup period at a rate proportional to a time constant associated with a soft start capacitor and a soft start current source used to charge the soft start capacitor; and ramping up the dynamic bias current to the dynamically biased apparatus during a dynamic bias startup period following the static bias startup period; and commencing charging of the soft start capacitor at power-on to initiate the static bias startup period; at the beginning of the static bias startup period, injecting current from a static bias current source into the dynamically biased apparatus at a selected node in order to disable the output of the dynamically biased apparatus; and at the beginning of the static bias startup period, disabling an operating current associated with a dynamic bias current source by disabling an input current to a time-delayed current mirror, the time-delayed current mirror to function as a sink for the operating current.

15. The method of soft startup of claim 14, further comprising:
shunting the input current to the time-delayed current mirror away from the time-delayed current mirror through an output of a bypass current mirror during the static bias startup period.

16. The method of soft startup of claim 14, further comprising:
following the static bias startup period, enabling the input current to the time-delayed current mirror; and
charging a dynamic bias startup capacitor associated with the time-delayed current mirror through a dynamic bias startup resistor associated with the time-delayed current mirror using the input current, values of the dynamic startup capacitor and the dynamic startup resistor determinant of a time constant associated with the dynamic bias startup period.

17. The method of soft startup of claim 14, further comprising:
sinking increasing amounts of operating current at an output of the time-delayed current mirror during the dynamic bias startup period to enable the dynamic bias current source and to commence operation of the dynamically biased apparatus in a dynamic transconductance mode.

* * * * *